US006643050B2

(12) United States Patent
Rukavina et al.

(10) Patent No.: US 6,643,050 B2
(45) Date of Patent: Nov. 4, 2003

(54) COLORED ELECTROCHROMIC TRANSPARENT WINDOW ASSEMBLIES (75) Inventors: Thomas G. Rukavina, New Kensington, PA (US); Chia-Cheng Lin, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/879,260

(22) Filed: Jun. 12, 2001

(65) Prior Publication Data

US 2002/0118437 A1 Aug. 29, 2002

Related U.S. Application Data (60) Provisional application No. 60/211,137, filed on Jun. 13, 2000.

(51) Int. Cl.[7] .................................................. G02F 1/15
(52) U.S. Cl. ...................... 359/265; 359/273; 359/275
(58) Field of Search .............................. 359/265, 266, 359/267, 268, 269, 270, 271, 272, 273, 274, 275

(56) References Cited

U.S. PATENT DOCUMENTS

| 3,806,229 A | | 4/1974 | Schoot et al. ............ 359/273 |
| 5,124,832 A | * | 6/1992 | Greenberg et al. ........ 359/269 |
| 5,239,406 A | | 8/1993 | Lynam .................... 359/275 |
| 5,481,395 A | | 1/1996 | Byker ..................... 359/272 |
| 5,668,663 A | * | 9/1997 | Varaprasad et al. ....... 359/608 |
| 5,792,559 A | | 8/1998 | Heithoff et al. .......... 428/437 |
| 5,808,778 A | | 9/1998 | Bauer et al. .............. 359/267 |
| 5,889,608 A | | 3/1999 | Buffat et al. ............. 359/273 |
| 5,928,572 A | | 7/1999 | Tonar et al. .............. 252/583 |
| 5,998,617 A | | 12/1999 | Srinivasa et al. ......... 544/347 |
| 6,020,987 A | * | 2/2000 | Baumann et al. .......... 359/273 |
| 6,262,832 B1 | * | 7/2001 | Lomprey et al. .......... 359/265 |
| 6,304,363 B1 | * | 10/2001 | Lynam .................... 359/275 |
| 6,373,618 B1 | * | 4/2002 | Agrawal et al. ........... 359/265 |

FOREIGN PATENT DOCUMENTS

EP 0 671 294 A1 9/1995 ............. B60R/1/08

OTHER PUBLICATIONS

Judd, D.B., NBS Special Publication, 545–Contributions To Color Science "The 1931 I.C.I. Standard Observer and Coordinate System For Colorimetry", *Journal of the Optical Society of America*, vol. 23, Oct. 1933; pp. 359–374.
U.S. 60/211,137, Colored Electrochromic Transparent Window Assemblies, Jun. 13, 2000.

* cited by examiner

*Primary Examiner*—Georgia Epps
*Assistant Examiner*—Tuyen Tra
(74) *Attorney, Agent, or Firm*—Andrew C. Siminerio (57) ABSTRACT

The present invention provides an electrochromic window assembly having coloration associated therewith. The assembly includes an electrochromic device defined by two transparent substrates defining a chamber therebetween, and an electrochromic medium including at least one dye contained within the chamber. At least one of the two substrates has a color. The at least one dye also has a color, which either coordinates with the color of the at least one substrate to produce a window assembly of a desired color, or which complements the color of the at least one substrate.

37 Claims, 2 Drawing Sheets

COLORED ELECTROCHROMIC TRANSPARENT WINDOW ASSEMBLIES

RELATED APPLICATION

This application claims the benefit of U.S. Provisional Application No. 60/211,137 filed Jun. 13, 2000.

FIELD OF INVENTION

The present invention relates to colored electrochromic transparent window assemblies. More particularly, the present invention relates to transparent window assemblies incorporating desired coloring characteristics based on electrochromic principles, particularly useful in motor vehicles and buildings.

BACKGROUND OF THE INVENTION

Electrochromic devices have been proposed for a number of uses, such as architectural windows and automotive windows and mirrors. Such electrochromic devices typically include a sealed chamber defined by two pieces of glass that are separated by a gap or space that contains an electrochromic medium. The glass substrates typically include transparent conductive layers coated on facing surfaces of the glass and in contact with the electrochromic medium. The conductive layers on both glass substrates are connected to electronic circuitry that is effective to electrically energize the electrochromic medium to change the light transmission through the medium. For example, when the electrochromic medium is energized, it can darken and begin to absorb light, which can involve a color change of the medium.

Electrochromic devices have most commonly been used in rear-view mirrors for automotive applications. In such uses, a photocell can be incorporated into the electrochromic cell to detect a change in light reflected by the mirror. When a specific level of light is reflected, for instance when lights are reflected at night, the photocell can activate to apply an electrical potential to the electrodes in the cell, thus causing the electrochemical medium to change color and create a darkening affect, thereby dimming the mirror to the lights. Electrochromic devices have also been mentioned for use in other automotive applications, such as windows and sunroofs, as well as architectural applications such as building windows.

The color of windows can provide certain aesthetic considerations, particularly in automobiles and architectural applications. For instance, specific glass colors are chosen to coordinate with the color of the paint of an automobile or the surrounding environment.

The perceived color of an object, and in particular glass, is highly subjective. Observed color will depend on the lighting conditions and the preferences of the observer. In order to evaluate color on a quantitative basis, several color order systems have been developed. One such method of specifying color adopted by the International Commission on Illumination (CIE) uses a dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as L*, a* and b*, are calculated from the tristimulus values (X, Y, Z). L* indicates the lightness or darkness of the color and represents the lightness plane on which the color resides. a* indicates the position of the color on a red (+a*) green (−a*) axis. b* indicates the color position on a yellow (+b*) blue (−b*) axis. When the rectangular coordinates of the CIELAB system are converted into cylindrical polar coordinates, the resulting color system is known as the CIELCH color system which specifies color in terms of lightness (L*) and hue angle (H°) and chroma (C*). L* indicates the lightness or darkness of the color as in the CIELAB system. Chroma, or saturation or intensity, distinguishes color intensity or clarity (i.e. vividness or dullness) and is the vector distance from the center of the color space to the measured color. The lower the chroma of the color, i.e. the less its intensity, the closer the color is to being a so-called neutral color. With respect to the CIELAB system, $C^* = (a^{*2} + b^{*2})^{1/2}$. Hue angle distinguishes colors such as red, yellow, green and blue and is a measure of the angle of the vector extending from the a*, b* coordinates through the center of the CIELCH color space measured counterclockwise from the red (+a*) axis. As used herein, H° will be expressed as a value between 0°–360°. The CIELAB system is superimposed over the CIELCH system in FIG. 1 of U.S. Pat. No. 5,792,559, hereby incorporated herein which illustrates the relationship between the two systems.

It should be appreciated that the color can be characterized in any of these color systems and one skilled in the art can calculate equivalent DW and Pe values; L*, a*, b* values; and L*, C*, H° values from the transmittance curves of the viewed glass or composite transparency.

Typical commercial soda-lime-silica glass includes the following materials: 66–75 wt. % $SiO_2$, 10–20 wt. % $Na_2O$, 5–15 wt. % CaO, 0–5 wt. % MgO, 0–5 wt. % $Al_2O_3$, 0–5 wt. % $K_2O$, 0–1 wt. % BaO. To this base glass, varieties of colorants are added to produce a desired glass color. As used herein, a glass is considered to be a colored glass if its luminous transmittance (as is discussed later in more detail) is ≦87%, irrespective of total glass thickness. Glass having a luminous transmittance of >87% is considered to be clear. It should be appreciated that when a "glass" or "glass substrate" is referred to herein as colored, in the case of a composite transparency having two or more glass plies, the combined thickness of all the plies is determinative as to whether the glass or glass substrate of the transparency is colored.

Many of these colored glasses, which are well known in the art, are used in automotive and architectural applications and absorb more solar energy than clear soda-lime-silica glass. The primary colorant in typical green tinted glasses used in automotive applications is iron, which is present in both the $Fe_2O_3$ and FeO forms. Other glasses include additional colorants such as cobalt, selenium, nickel and/or chrome to produce blue, bronze and gray colored glasses, as is known in the art. As known in the prior art, colorants can also be added to the basic iron containing soda-lime-silica glass composition to reduce the color intensity in the glass, and in particular to produce a neutral gray glass as described in U.S. Pat. No. 5,792,559 hereby incorporated by reference. Combinations of colorants, e.g. combinations of cobalt and selenium, can be preferentially added to the base glass composition to produce a gray colored glass. However, addition of multiple colorants requires a reduction in iron content in order to maintain a constant visible transmittance. Since these additional colorants are less powerful than FeO in absorbing solar energy, TSET will increase and the performance ratio will decrease for the glasses which include iron, cobalt and selenium (trend line 4) as colorants. The aforementioned 5,792,559 patent also shows that it is known that colored interlayer material can be combined with glass plies to produce a desired color.

One way of comparing the performance of various solar energy absorbing glasses is to compare the ratio of luminous transmittance to the total solar energy transmittance. Luminous transmittance, LT, is a measure of the total amount of visible light transmitted through the glass. Total solar energy transmittance, TSET, is a measure of the total amount of solar energy transmitted directly through the glass. This latter property is important because most of this transmitted energy is converted to heat after being absorbed by objects on the other side of the glass. In particular, as it applies to automotive uses, heat build-up and temperature within the vehicle are directly related to TSET. This can result in uncomfortable conditions for vehicle occupants and may require an increase in the cooling capacity of an air conditioning system. In addition, it has been shown that the heat buildup accelerates material degradation within the vehicle. As used herein, this ratio of luminous transmittance to total solar energy transmittance is referred to as the "performance ratio" (PR).

Unless otherwise noted, luminous transmittance data provided in this disclosure is measured for CIE standard illuminant A (LTA) and the color data (i.e. L*, a* and b*) is measured for CIE standard illuminant D65. This data is further based on a 2° observer over the wavelength range 380–780 nanometers ("nm") at 10 nm intervals in accordance with ASTM 308E-90. The dominant wavelength data is measured for CIE standard illuminant C and a 2° observer over the wavelength range 380–780 nm using the techniques disclosed in the National Bureau of Standards Special Publication 545—*Contributions to Color Science* (see Judd, D. B., "The 1931 I.C.I. Standard Observer and Coordinate System for Colorimetry", *Journal of the Optical Society of America,* vol. 23, October 1933, pages 359–374). The total solar energy transmittance data provided in this disclosure to calculate the performance ratio of a glass or composite transparency is based on Parry Moon air mass 2.0 solar data and is computed based on measured transmittance from 300–2000 nm. Typical performance ratios of glasses using various colorants are illustrated in FIG. 2 of U.S. Pat. No. 5,792,559, hereby incorporated herein.

Also, it is known to combine various color dyes in electrochromic medium with clear glass substrates in such electrochromic devices in order to obtain a desired color. For example, U.S. Pat. Nos. 6,020,987 to Baumann et al. and 5,998,617 to Srinivasa et al. incorporate three separate electroactive materials as an electrochromic medium to obtain a desired color, such as a neutral gray, throughout the voltage ranges of the device.

U.S. Pat. No. 5,808,778 discloses rear view mirrors using electrochromic compounds which transmit light in the orange/red visible spectrum and which absorb light in the blue/green visible spectrum. As such, glare from high intensity halogen headlights can be reduced. Further, U.S. Pat. No. 5,239,406 discloses electrochromic devices such as rear-view mirrors and window glazings which include glass of various colors. Such electrochromic devices, however, fail to address the association between the color of the glass and the color and intensity of the dye used in the electrochromic device.

Thus, there is a need for transparent assemblies that can be made in a variety of colors and shades, which are easy to fabricate, and which can be switchable with respect to luminous transmittance.

SUMMARY OF THE INVENTION

The present invention is directed to an electrochromic transparency such as an electrochromic window assembly comprising: first and second spaced transparent substrates defining a chamber therebetween, at least one of the first and second transparent substrates having a color; and an electrochromic medium contained in the chamber, the electrochromic medium including at least one dye defining a color in an electrochemically activated state upon application of electrical potential selected from colors that coordinate with the color of one of the first and second transparent substrates and colors that complement the color of one of the first and second transparent substrates. In one nonlimiting embodiment of the invention, the window assembly is selected from automotive windshields, automotive side windows, automotive sunroofs, architectural glazings, architectural windows, architectural skylights, and aircraft transparencies and portions thereof.

DESCRIPTION OF THE PREFERRED EMBODIMENTS

The present invention provides an electrochromic window assembly having coloration associated therewith. The assembly includes an electrochromic device having two transparent substrates defining a chamber therebetween, and an electrochromic medium including at least one dye contained within the chamber. At least one of the two substrates has a color. The dye also has a color in its electrochemically activated state, which is either coordinating with the color of the substrate to produce a window assembly of a desired color, or which is complementary to the color of the substrate to reduce the color intensity and provide a window assembly of a desired neutral gray color.

For the purposes of this specification, unless otherwise indicated, all numbers expressing quantities of materials, dimensions, voltages, color and performance measurements and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Figure 1:
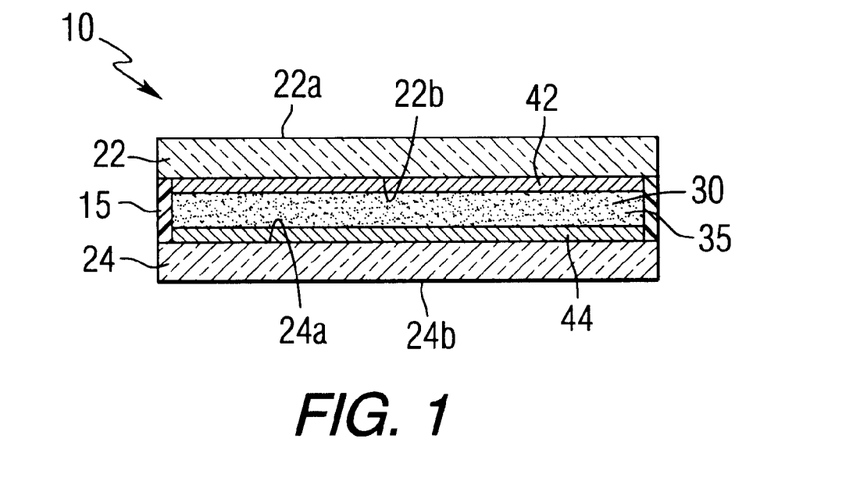
FIG. 1 is a sectional side elevation of an electrochromic window assembly, which incorporates features of the present invention.

With specific reference to the drawings, FIG. 1 shows a cross-sectional side elevation of an electrochromic device 10, in the form of an electrochromic window assembly. Electrochromic device 10 includes first substrate 22 and second substrate 24 spaced therefrom. First substrate 22 and second substrate 24 can be in any desired shape, depending on the particularly desired use. For example, when electrochromic device 10 is desired for use in an automotive sunroof, it can be formed in a generally rectangular shape. In addition, the substrates can be flat or incorporate simple or complex curvatures. Further, such substrates can be made of any material known in the art for use in electrochromic devices. For example, such substrates can be made from polymeric materials, glass, and the like. Preferably, at least one or both of first substrate 22 and second substrate 24 are made of glass, more preferably, float glass.

First substrate 22 includes outer surface 22a and inner surface 22b, while second substrate 24 includes outer surface 24a and inner surface 24b. Outer surface 22a of first substrate 22 represents the external surface of electrochromic device 10 and of the assembly, and inner surface 24b of second substrate 24 represents the inner surface of electrochromic device 10 and of the assembly. Inner surface 22b of first substrate 22 and outer surface 24a of second substrate 24 face each other in a generally equal-spaced relationship, such that first substrate 22 and second substrate 24 are generally parallel with respect to each other, defining chamber 30 therebetween.

First substrate 22 is preferably spaced from second substrate 24 by way of spacing element 15. Spacing element 15 can be positioned in any manner capable of maintaining proper spacing between first substrate 22 and second substrate 24. In one nonlimiting embodiment, spacing element extends about the perimeter of electrochromic device 10, adjacent the outer edges of first substrate 22 and second substrate 24 in a sealing manner, as is known in the art. Further, spacing element 15 can be constructed of any material, such as but not limited to polymeric material or glass. In one nonlimiting embodiment, sealing element 15 is a curable organic polymeric material, such as but not limited to a thermoplastic, thermosetting or UV curing resin material. Epoxy based organic sealing materials can also be used as sealing element 15.

First substrate 22 and second substrate 24 are both transparent, apart from the electrochromic assembly as a whole. For the purposes of the present invention, transparency is defined by a material having a luminous transmittance of at least 70%.

Inner surface 22b of first substrate 22 and outer surface 24a of second substrate 24 are provided with a layer of a transparent electrically conductive material 42 and 44, respectively, to act as electrodes. Conductive materials 42 and 44 can be any material that is substantially transparent to visible light; bonds well to the substrate surfaces; is resistant to corrosion by any materials within the electrochromic device as well as the atmosphere; and has good electrical conductance. Conductive materials 42 and 44 can be, for example, fluorine doped tin oxide (FTO), tin doped indium oxide (ITO), ITO/metal/ITO (IMI), as well as any other materials known in the art. Conductive materials 42 and 44 are connected to a source of electrical energy through wire leads and bus bars (not shown).

Electrochromic medium 35 is contained within chamber 30 between first substrate 22 and second substrate 24. Electrochromic medium 35 can be any type of material as is known in the art, and can be in any known form, for example, electrochromic solutions, gels, semi-solid materials, and the like. Electrochromic medium 35 includes a dye that defines a color. Such materials are well known in the art to color to successively darker colors or shades as larger voltages are applied. When voltage is turned off or short in cells reversed, the coloring is bleached, allowing full transmittance of light through electrochromic medium 35.

Electrochromic medium 35 can be a solution-phase type electrochromic medium, in which a material contained in solution in an ionically conducting electrolyte remains in solution in the electrolyte when electrochemically reduced or oxidized (including a gel). Electrochromic medium 35 can alternatively be a surface-confined electrochromic medium, in which a material which is attached directly to an electronically conducting electrode or confined in close proximity thereto remains attached or confined when electrochemically reduced or oxidized. Alternatively, electrochromic medium 35 can be an electrodeposition-type electrochromic medium, in which a material contained in solution in the ionically conducting electrolyte forms a layer on the electronically conducting electrode when electrochemically reduced or oxidized.

Electrochromic medium 35 can also include other materials such as solvents, light absorbers, light stabilizers, thermal stabilizers, antioxidants, thickeners, viscosity modifiers and similar materials.

Without limiting the present invention, the electrochromic medium 35 can be a thermosetting or thermoplastic material. Suitable thermosetting materials include, but are not limited to, thermosetting polyesters, vinyl esters, epoxies, acrylates, phenolics, aminoplasts, thermosetting polyurethanes, derivatives of any of the foregoing, and mixtures of any of the foregoing. An electrochromic device which incorporates a thermosetting medium is disclosed in U.S. Pat. No. 5,928,572, which teaching are incorporated by reference. Suitable thermoplastic materials include materials that are gels at 10% solids or less and do not flow or soften at temperatures up to 200° F. (93° C.). Nonlimiting examples of suitable gel materials include polyacrylates, methacrylates, ethylhexylacrylate and copolymers thereof. Although not required, these materials can be prepared via free-radical polymerization using azo-bis(isobutyro)nitrile (AIBN) as the initiator and propylene carbonate or acetonitrile as the solvent. Monomers that can be used to make the desired thermoplastic material include, but are not limited to hydroxypropylacrylate (HPA), hydroxyethylacrylate, 2-cyanoethylacrylate (CEA) and methyl methacrylate (MMA)(in cyclohexanone).

Electrochromic medium 35 includes at least two compounds, including at least one anodic electrochromic compound and at least one cathodic electrochromic compound, with the anodic compound representing an oxidizable material and the cathodic compound representing a reducible material. Upon application of electrical potential to the electrochromic medium, the anodic electrochromic compound oxidizes and the cathodic electrochromic compound simultaneously reduces. Such simultaneous oxidation and reduction results in a change in the absorption coefficient at least one wavelength in the visible spectrum when electrochemically activated. The combination of such anodic and cathodic electrochromic compounds in electrochromic medium 35 defines the dye having a color associated therewith upon application of electrical potential.

Although not meant to be limiting in the present invention, the electrochemically active materials can be organic dyes. In one nonlimiting embodiment of the invention, particularly useful cathodic electrochromic compounds are those commonly referred to as viologen dyes, and particularly useful anodic electrochromic compounds are those commonly referred to as phenazine dyes. Moreover, specific dyes and combinations thereof are known to define specific colors upon application of electrical potential. For example, it is known that specific combinations of cathodic compounds with specific anodic compounds will produce electrochromic dyes capable of coloring upon application of an electrical potential. Nonlimiting examples of combinations include 5,10-dimethyl-5,10-dihydrophenazine as an anodic compound which is a generally yellow color, which can be combined in an electrochromic medium with: (a) 1,1'-diphenyl-4,4'-dipyridinium bis(tetrafluoroborate) as a cathodic compound resulting in a generally green color upon application of an electrical potential thereto; (b) 1-phenyl-1'-(4-dodecylphenyl)-4,4'-dipyridinium bis(hexafluorophosphate) as a cathodic compound resulting in a generally green color upon application of an electrical potential thereto; (c) 1,1'-bis(2,6-dimethylphenyl)-4,4'-dipyridinium bis(tetrafluoroborate) as a cathodic compound resulting in a generally blue color upon application of an electrical potential thereto; (d) 1,1'-bis(2,4,6-trimethylphenyl)-4,4'-dipyridinium bis (tetrafluoroborate) as a cathodic compound resulting in a generally blue color upon application of an electrical potential thereto; (e) 1,1'-dimethyl-2-(3-phenyl(n-propyl))-4,4'-dipyridinium bis(hexafluorophosphate) as a cathodic compound resulting in a generally blue color upon application of an electrical potential thereto; (f) 1,1'-dibenzyl-2,2',6,6'-tetramethyl-4,4'-dipyridinium bis(tetrafluoroborate) as a cathodic compound resulting in a generally blue color upon application of an electrical potential thereto; (g) 1,1'-dimethyl-2,2'-bis(3-phenyl(n-propyl))-4,4'-dipyridinium bis (tetrafluoroborate) as a cathodic compound resulting in a generally blue color upon application of an electrical potential thereto; (h) 1,1'-dimethyl-4,4'-(1,3,5-triazine-2,4-diyl) dipyridinium diperchlorate as a cathodic compound resulting in a generally purple color upon application of an electrical potential thereto; (i) 1,1'-ethylene-4,4'-dimethyl-2,2'-dipyridinium bis(hexafluorophosphate) as a cathodic compound resulting in a generally green color upon application of an electrical potential thereto; and (j) 1-phenyl(n-propyl)-4,4'-bis(tetrafluoroborate) as a cathodic compound resulting in a generally blue color upon application of an electrical potential thereto.

Among the dyes suitable for use in the present invention are those disclosed in U.S. Pat. No. 3,806,229. Other known compounds can also be used as the electrochromic compounds of the present invention, such as those disclosed in U.S. Pat. Nos. 5,481,395 and 5,998,617.

As indicated, electrochromic medium 35 defines a specific color upon application of an electrical potential. When no electrical potential is applied to the electrochromic window assembly, the window assembly defines a specific color based on the color of the glass substrates. When electrical potential is applied, the dye of the electrochromic medium is activated, thus causing the dye to change to its predetermined color. In this manner, the window assembly defines a specific color based on the combination of the color of the glass substrates and the color of the dye in the electrochromic medium. The color of the window assembly will depend on whether or not the dye is in its electrochemically activated state.

The transparent substrates and at least one dye of the electrochromic medium both include a color, with the color of the transparent substrates and the color of the dye in its electrochemically activated state either coordinating or complementing each other. As used herein, the term "coordinate" means a color having a hue angle equal to that of the substrate ±45°. In other nonlimiting embodiments of the present invention, the coordinating color has a hue angle equal to that of the substrate ±30°, or ±20°. As used herein, the term "complement" means a color having a hue angle equal to that of the substrate plus 180°±45°. In other nonlimiting embodiments of the present invention, the complementary color has a hue angle equal to that of the substrate plus 180°±30°, or 180°±20°. Accordingly, although not required by the present invention, an electrochromic medium having a color that coordinates with that of a substrate preferably falls approximately in the same quadrant of the CIELAB color space as the substrate, while an electrochromic medium having a color that complements that of a substrate preferably falls approximately on the opposite quadrant of the CIELAB color space from the substrate. For example, if the substrate color falls in the upper left quadrant of FIG. 1 bounded by the green and yellow axes, the dye having a coordinating color will fall within the same quadrant, while a dye having a complementing color will fall in the lower right quadrant bounded by the red and blue axes.

It is also contemplated by the present invention that the electrochromic window assembly can define a color that is different than the color of the substrates and the color of the dye in the electrochromic medium. For example, it is contemplated that a colored glass can be combined with a dye in the electrochromic medium, with the color of the dye in the electrochemically activated state being generally complementary to the color of the glass, but not entirely complementary. In this manner, application of electrical potential will result in a gray colored window assembly that is slightly colored. For example and without limiting the present invention, brown glass can be used as the substrate material for the electrochromic assembly, and the electrochromic medium can include a dye that is blue/green when electrochemically activated. Such a window assembly can color to a blue/green gray color, thus producing a window assembly of a colored gray, not necessarily a neutral gray.

It is further contemplated by the present inventors that dyes used in the electrochromic medium of electrochromic devices are vulnerable to degradation by visible light, as well as by ultraviolet light. As such, incorporating specific colored glasses as the substrate materials can alleviate such degradation, and result in a more effective electrochromic device having a longer life. Of particular note are brown glasses, which are believed to be useful in protecting the dyes from shorter wavelength visible light. By incorporating such materials as the substrate, degradation of the dyes is minimized while maintained the desired characteristics of color coordination or color complements in the window assembly.

Various combinations of substrates and dyes can be made in order to produce the window assembly having the desired characteristics. For example, to produce a window assembly having a desired color, a glass of that desired color can be used as one or both substrates in an electrochromic cell, with a dye of a coordinating color incorporated into the electrochromic medium of the window assembly. More specifically and without limiting the present invention, blue glass can be used as a substrate material with an electrochromic medium including a coordinating dye which appears blue upon application of electrical potential. The general appearance of the window assembly when no electrical potential is applied thereto is a generally blue color, due to the blue glass. Upon application of electrical potential, the dye in the electrochromic medium will change to its blue color, resulting in a window assembly having a blue color which is different than the blue color of the assembly when no potential is applied, such as a darker shade of blue.

To produce a window assembly having a neutral-gray color, a glass of a specific color can be used as one or both substrates in an electrochromic cell, with a dye of a complementing color incorporated into the electrochromic medium of the window assembly. More specifically, by combining the substrate with one or more dyes having a complementary color when electrochemically activated, the intensity of the color, i.e. chroma (as measured by C*), of the window assembly can be reduced, resulting in a more neutral colored assembly. For example and without limiting the present invention, blue glass can be used as a substrate material with an electrochromic medium including a coordinating dye having an orange or brown color upon application of electrical potential. The general appearance of the window assembly when no electrical potential is applied thereto is a generally blue color, due to the blue glass. Upon application of electrical potential, the dye in the electrochromic medium will change to its orange or brown color, resulting in a window assembly having a neutral gray color which is different, and likely darker, than the blue color of the assembly when no potential is applied. Although not limiting in the present invention, in several embodiments, C* is no greater than 15, or no greater than 10, or no greater than 5.

It is contemplated that glass of various colors including green, blue, brown, gray, bronze, and mixtures thereof can be used as the substrates, in conjunction with coordinating or complementing dyes of various colors, to produce the window assemblies of the present invention.

As indicated, the electrochromic medium includes a dye that defines a predetermined color upon application of an electrical potential to the electrochromic medium. Application of the electrical potential can be constant, to produce a window assembly having a constant color and darkness and/or shading defined by the color of the glass and the color of the dye. In such an embodiment, the electrochromic window assembly could have a specific color associated therewith, and a constant LTA value. For example, it may be desirable to incorporate a generally blue colored window to an automobile having a blue color finish paint. To achieve this effect, a generally blue colored glass can be used as one or more substrates in an electrochromic window assembly. Further, the electrochromic medium includes a dye that defines a generally blue color upon application of electrical potential. In order to maintain the generally blue color, the electrical potential is constantly applied to the window assembly. In automotive applications, this can be achieved by applying a constant electrical potential to the window assembly, when the automobile is operating and when it is shut off. In this manner, a constant colored window which coordinates with the finish paint color of the automobile is achieved.

In such automobile applications, it may further be desirable to maintain a specific LTA value when the glass is maintained at a certain color. For example, certain countries require a minimum LTA value, for example a minimum of 70% LTA through the main viewing portion of the transparency, for certain automotive windows, such as a windshield. As such, in one nonlimiting embodiment of the present invention, the LTA of such a window assembly for such applications is maintained at a minimum of 70% LTA throughout the constant applied potential in the viewing portion of the assembly. It should be appreciated that windows such as automotive windshields typically include a shadeband along the upper edge of the windshield which can have an LTA of less than the minimum LTA requirement.

Alternatively, application of the electrical potential can be selective, such that the electrochromic window assembly can be selectively activated to color to the predetermined color by applying the electrical potential to cause the dye of the electrochromic medium to color. In this manner, the electrochromic window assembly can be switchable between one predetermined color, based on the color of the substrates, when no electrical potential is applied, and between a second predetermined color, based on the color of the substrates and the color of the electrochromic medium, when electrical potential is applied. In one nonlimiting embodiment of the present invention, such coloring between the applied and non-applied applied electrical states is self-erasable, such that it is switchable between an electrochemically activated state where the electrochromic medium colors upon application of the electrical potential, and an electrochemically non-activated state where the electrochromic medium automatically returns or erases to its colorless state when the electrical potential is removed. This feature is most easily accomplished by providing a switch for selectively applying electrical potential to the window assembly.

In a further nonlimiting embodiment, the electrochromic window assembly is switchable and non-self-erasing, such that application of the electrical potential causes the electrochromic medium to color, and the electrochromic medium will remain in the colored state until the electrical potential is reversed.

Moreover, the color of the dye can be of a constant darkness or shade upon application of an electrical potential, or can be of varying degrees of darkness or shading upon varying of the electrical potential. For example, specific coloring or shading of the coloring can be varied over a range of voltages. Upon application of a low voltage to the electrochromic medium, the dye can begin to color. Increasing the voltage can cause the color of the dye to darken to a deeper shade or intensity. In this manner, the window assembly can include varying degrees of light transmittance upon varying of the electrical potential. The window assembly can therefore be adjusted to a desired level of darkness or shading based upon the amount of electrical potential applied thereto. This can be easily accomplished, for example, by incorporating a switch between the source of electricity and the conductor. In one nonlimiting embodiment, the electrochromic window assembly is switchable between an LTA value of 1 percent to 80 percent. As such, the electrochromic window assembly can effectively function as an opaque shade for a window when desired.

Although not limiting in the present invention, specific voltages contemplated by the present invention range from 0.4 to 1.2 volts, for example 0.6 to 0.8 volts.

In one nonlimiting embodiment of the present invention, the lightness or darkness of the color or the color shade is variable according to the amount of voltage applied to the assembly. When the assembly includes substrates of one color and an electrochromic medium of a complementing color, application of the electrical potential to the assembly causes the dye in the medium to begin to color, resulting in a neutral gray color for the assembly, based on the complementing colors of the glass and of the dye. Application of higher voltages to the assembly will cause the dye of the electrochromic medium to color to a darker shade. The shade of the color of the dye in the electrochromic medium therefore must be controlled in order to maintain a neutral gray color. For example, it is contemplated by the present invention that the varying darkness' and shades of colors achieved with such electrochromic dyes causes the color of the dye to pass beyond a threshold which produces an overall neutral gray color for the assembly, and the color of the assembly begins to change to a color beyond gray, taking on the color of the dye. It is believed that the color and shade of the substrates is directly related to the amount of coloring of the electrochromic dye required to neutralize the color of the substrates. Thus, it is necessary to limit the voltage applied to the assembly, depending on the coloring of the substrate surfaces.

Figure 3:
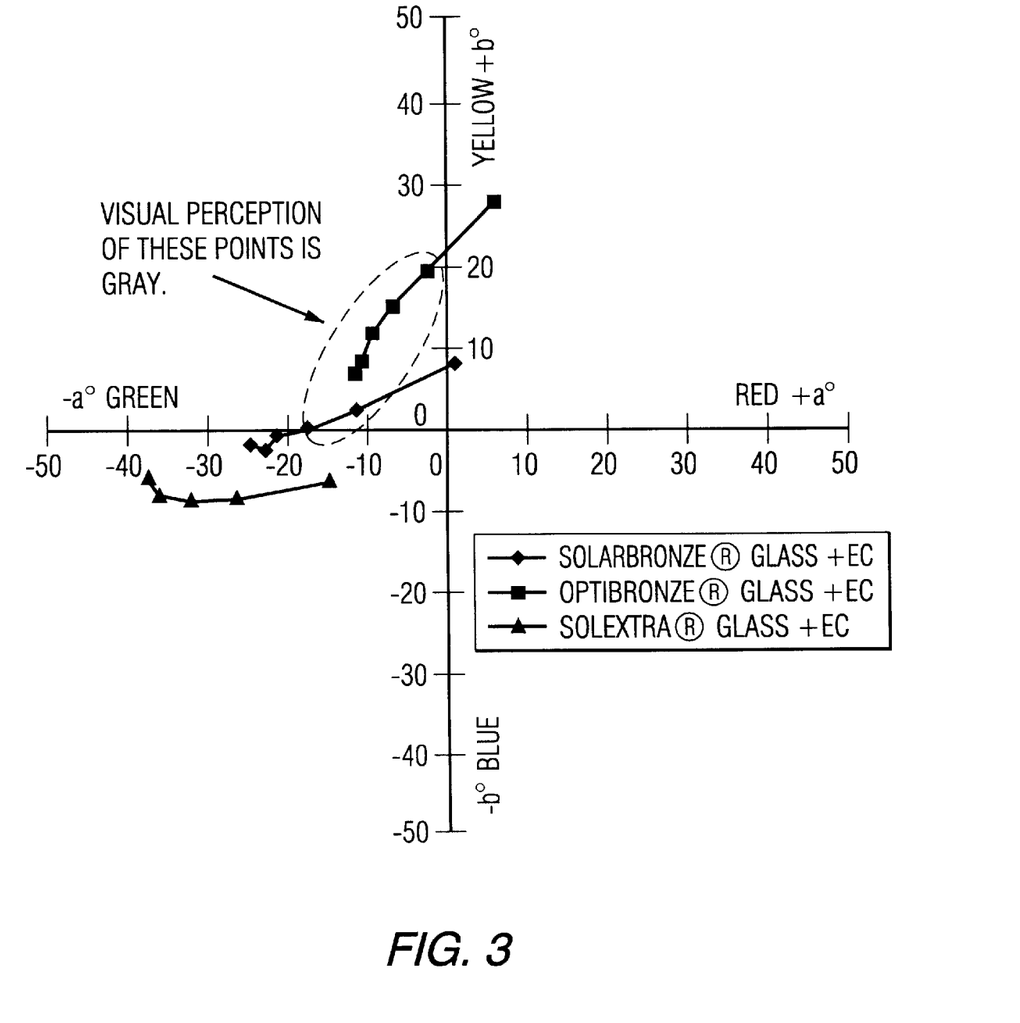
FIG. 3 depicts several curves representing the color coordinates of various electrochromic window assemblies according to the present invention including various colored substrates with various colored dyes at varying voltage levels applied to the assemblies.

It is contemplated by the present invention that the threshold shade of coloring for a particular dye used with a particular substrate to produce a neutral gray is related to the color chart depicted in FIG. 3. For example, the color of the substrates used in the electrochromic device will appear in one quadrant of the color chart. Typically, using a dye of a specific color in an opposite quadrant of the color chart would expectedly produce a neutral gray color. In order to maintain such as neutral gray color, however, the voltage of the assembly must be regulated so as to maintain the shade of the dye of the electrochromic medium at a level which causes the color of the overall assembly to pass only to an adjacent quadrant, and not to an opposite quadrant of the color chart. If the voltage level is increased above such a level, the overall color of the assembly will pass beyond this neutral gray color, and will begin to take on a color of the dye.

In another nonlimiting embodiment of the present invention, the window assembly is configured so that only a portion of the transparency changes in color. This can be accomplished using a variety of different power connections and/or dye configurations. In one nonlimiting embodiment, only selected portions of the transparency include electrochemically activated materials, e.g. only the upper edge portion of an automotive windshield. When an electrical potential is applied, the upper edge darkens and functions like a shadeband. As an alternative, the electrical connections can be configured such that an electrical potential is applied only over a selected portion of the transparency so that only that portion of the dye that is subjected to the electrical potential changes color.

In one nonlimiting embodiment contemplated by the present invention, the electrochromic window assembly is an automotive sidelight in which electrical potential is applied when the automobile engine is turned off and in which the electrical potential is removed when the automobile engine is turned on. In this manner, the electrochromic window assembly is in a darkened state when the automobile is off, with the color of the darkened state being defined by the combination of the color of the glass substrates and the color of the dye in the electrochromic medium when electrochemically activated. The darkened state can therefore prevent light from passing through the window assembly to provide security and to keep the interior of the automobile cooler when the automobile engine is off.

In a nonlimiting variation of this embodiment, the electrochemical window assembly can include a switch for control by a driver or passenger within the automobile. When desired, the switch can be activated, and the color of the window assembly will change, for example, to a darker shade of the color or to a dark gray-neutral color.

Figure 2:
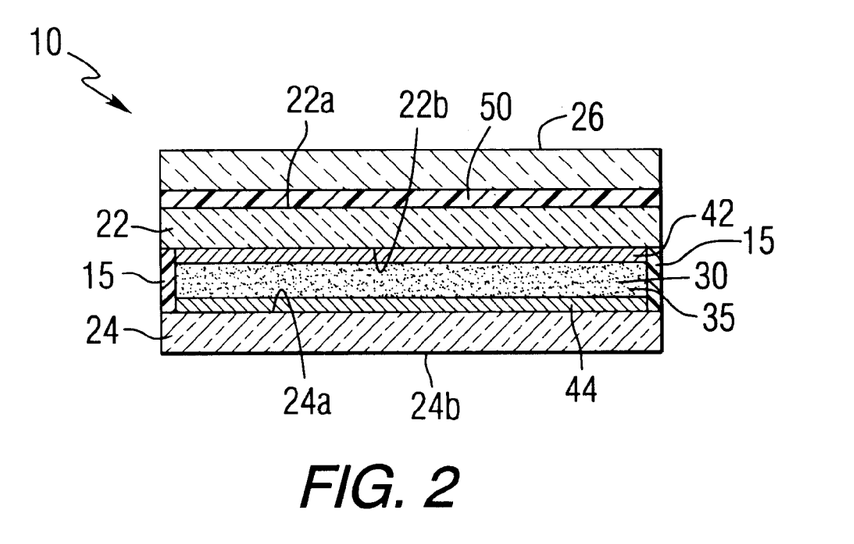
FIG. 2 is a sectional side elevation similar to FIG. 1 of an alternate electrochromic window assembly incorporating features of the present invention.

A further nonlimiting embodiment of the present invention is depicted in FIG. 2. In FIG. 2, an electrochromic cell is defined by first and second substrates 22 and 24, with electrochromic medium 35 confined therebetween. In such an embodiment, outer surface 22a of first substrate 22 does not define the external environment. Instead, polymeric layer 50 is provided on outer surface 22a of first substrate 22. Polymeric layer 50 can be any polymeric material known in window and glass applications, such as but not limited to, polyvinyl butyral (PVB) and polyurethane (PUR). Further, polymeric layer 50 can be provided for a number of purposes. For example and without limiting the present invention, polymeric layer 50 can comprise a film that absorbs UV light, thereby providing an effective UV window assembly. Polymeric layer 50 can also be an antilacerative layer. If desired, third substrate 26 can be provided as an external surface, with polymeric layer 50 sandwiched between first substrate 22 and third substrate 26. Third substrate 26 can be selected from the same materials as first and second substrates 22 and 24, and can be the same as or different than the first and second substrates in any particular assembly.

As discussed earlier, nonlimiting applications of the present invention are for use in motor vehicles and building. Several nonlimiting examples of colored glasses used for such application include blue/green colored glasses and bronze colored glasses. It should be appreciated that the actual perceived color will depend on many factors, such as but not limited to, lighting, glass thickness and the perceptions of the observer. Blue/green glasses can be generally characterized as having a dominant wavelength generally ranging from 450 to 550 nm, with the more blue colored glasses at the lower dominant wavelengths, e.g. generally ranging from 450 to 495 nm or 470 to 490 nm, and the more green colored glasses at the higher dominant wavelengths, e.g. generally ranging from 495 to 550 nm or 500 to 520 nm. This 450 to 550 nm dominant wavelength range for blue/green glasses is generally equivalent to a hue angle range of 140° to 300°, with the more blue glasses at the middle to higher hue angles and the green glasses at the lower end of the range. For example in several nonlimiting embodiments of the present invention, the hue angle for blue glass generally ranges from 200° to 300°, or 200° to 240°, or 200° to 220°, and the hue angle for green glass generally ranges from 140° to 200°, or 150° to 190°, or 160° to 180°. It should be appreciated that although the color of a particular substrate is characterized above as "blue" or "green" or "blue/green", the green and blue contributions to each of these glass colors are apparent from the glass' a*, b* coordinates. Bronze colored glasses can be generally characterized as having a dominant wavelength ranging from 560 to 590 nm, which in turn generally corresponds to a hue angle ranging from 50° to 90°. In addition, in a manner as discussed above, it should be appreciated that although the color of the particular substrate is characterized as "light brown" or "dark brown", the glass typically includes slightly yellowish coloration as is apparent from it's a*, b* coordinates.

In one nonlimiting embodiment of the present invention, wherein the at least one dye in the electrochromic medium 35 defines a color upon application of an electrical potential which coordinates with the color of at least one of the substrates 22 and 24, the resulting color of the electrochemically activated dye has a dominant wavelength generally in the range discussed above and/or a hue angle as discussed earlier.

In another nonlimiting embodiment of the present invention, wherein the at least one dye in the electrochromic medium 35 defines a color upon application of an electrical potential which complements the color of at least one of the substrates 22 and 24, the resulting color of the electrochemically activated dye has a hue angle as discussed earlier.

With respect to dominant wavelengths and complementary colors, in one nonlimiting embodiment of the invention wherein the window assembly comprises at least one generally blue colored substrate having a dominant wavelength ranging from 450 to 495 nm, the resulting dominant wavelength of an at least one electrochemically activated dye which complements the blue glass color generally ranges from 570 to 640 nm. In another nonlimiting embodiment, for generally blue colored substrates having a dominant wavelength ranging from 470 to 490 nm, the resulting dominant wavelength of an at least one electrochemically activated dye which complements the blue glass color generally ranges from 570 to 620 nm.

In another nonlimiting embodiment of the invention wherein the window assembly comprises at least one generally green colored substrate having a dominant wavelength ranging from 495 to 550 nm, the resulting color of an at least one electrochemically activated dye which complements the green glass color is a purple color. In another nonlimiting embodiment of the invention, the resulting dominant wavelength of an at least one electrochemically activated dye which complements the green glass color generally ranges from 495 c to 550 c nm. In still another nonlimiting embodiment, for generally green colored substrates having a dominant wavelength ranging from 500 to 520 nm, the resulting dominant wavelength of an at least one electrochemically activated dye which complements the green glass color generally ranges from 500 c to 520 c nm.

In yet another nonlimiting embodiment of the invention wherein the window assembly comprises at least one generally bronze colored substrate having a dominant wavelength ranging from 560 to 590 nm, the resulting dominant wavelength of an at least one electrochemically activated dye which complements the bronze glass color generally ranges from 440 to 490 nm. In still another nonlimiting embodiment, for generally bronze colored substrates having a dominant wavelength ranging from 575 to 585 nm, the resulting dominant wavelength of an at least one electrochemically activated dye which complements the bronze glass color generally ranges from 470 to 490 nm.

It should be appreciated that the ability of a transparency to darken and/or become more neutral in color also has applicability in aircraft transparencies. More specifically, these features can be used to reduce, for example the amount of light, glare and heat build-up within an aircraft cabin.

The invention is illustrated in more detail in the following examples.

EXAMPLES

Example 1

Blue glass substrates are combined with an electrochromic medium including a dye that is blue in color upon application of an electrical potential to form a transparent window assembly. The glass substrate used is available from PPG Industries, Inc. of Pittsburgh, Pa. and sold under the SOLEXTRA® trademark. At an LTA level of 62%, the TSET of this glass is 32.4%, resulting in a performance ratio of 1.91. The dominant wavelength of this glass substrate is 487 nm and its color as described in the CIELAB and CIELCH color systems is $L^*=84.9$, $a^*=-13.7$, $b^*=-8.9$, $C^*=16.3$, and $H°=213°$.

Two blue glass substrates each having a thickness of 0.125 inches (3.175 mm) were spaced from each other with an electrochromic medium including a dye provided between the blue glass substrates. The electrochromic medium included a cathodic compound of viologen and an anodic compound of phenazine, which results in an electrochromic dye capable of coloring to a blue color upon application of electrical potential.

Upon application of an electrical potential to the electrochromic window assembly, the dye of the electrochromic medium immediately switched to a blue color, and the electrochromic window assembly appeared as a darker blue color.

Table I and FIG. 3 depict the LTA, $a^*$, $b^*$, and $C^*$ values for the electrochromic window assembly at varying voltages.

TABLE I

| VOLTS | LTA* (%) | a* | b* | C* |
|---|---|---|---|---|
| 0 | 53.54 | −14.83 | −6.01 | 16.00 |
| 0.6 | 29.84 | −26.75 | −8.24 | 27.99 |
| 0.7 | 19.74 | −32.36 | −8.46 | 33.45 |
| 0.8 | 13.15 | −36.07 | −8.03 | 36.95 |
| 0.9 | 7.78 | −36.57 | −8.04 | 37.44 |
| 1.1 | 4.97 | −37.93 | −6.12 | 38.42 |

As can be appreciated, increasing the voltage applied to the electrochromic window assembly causes the color of the dye to progressively darken. At a voltage of 0, representing no voltage applied to the assembly, the assembly has an LTA of 53.54%, and a generally blue color. Applying a voltage of 0.6 volts causes the LTA value to significantly drop to 29.84%, and causes the color of the assembly to appear as a much darker blue color. Further increases of the voltage up to 1.1 volts causes the LTA value to further drop, and causes the assembly to take on an even darker blue color.

Such an electrochromic window assembly is particularly useful as a sunroof in an automobile.

Example 2

Light brown glass substrates are combined with an electrochromic medium including a dye that is blue in color upon application of an electrical potential to form a transparent window assembly. The glass substrate used is available from PPG Industries, Inc. and sold under the SOLARBRONZE® trademark. At an LTA level of 50.7%, the TSET of this glass is 46%, resulting in a performance ratio of 1.10. The dominant wavelength of this glass substrate is 581 nm and its color as described in the CIELAB and CIELCH color systems is $L^*=75.86$, $a^*=2.09$, $b^*=6.54$, $C^*=6.87$, and $H°=72°$.

Two light brown glass substrates each having a thickness of 0.125 inches (3.175 mm) were spaced from each other with an electrochromic medium including a dye provided between the brown glass substrates. The electrochromic medium included a cathodic compound of viologen and an anodic compound of phenazine, which results in an electrochromic dye capable of coloring to a blue color upon application of electrical potential.

Upon application of an electrical potential to the electrochromic window assembly, the dye of the electrochromic medium immediately switched to a blue color, and the electrochromic window assembly appeared as varying shades of neutral gray.

Table II and FIG. 3 depict the LTA, a*, b*, and C* values for the electrochromic window assembly at varying voltages.

TABLE II

| VOLTS | LTA* (%) | a* | b* | C* |
|---|---|---|---|---|
| 0 | 43.76 | 0.74 | 8.35 | 8.38 |
| 0.6 | 23.54 | −11.46 | 2.83 | 11.80 |
| 0.7 | 15.19 | −17.41 | 0.62 | 17.42 |
| 0.8 | 9.89 | −21.55 | −0.62 | 21.56 |
| 0.9 | 5.73 | −22.81 | −2.12 | 22.91 |
| 1.1 | 3.59 | −24.62 | −1.54 | 24.67 |

As can be appreciated, increasing the voltage applied to the electrochromic window assembly causes the color of the dye to progressively darken. At a voltage of 0, representing no voltage applied to the assembly, the assembly has an LTA of 43.76%, and a generally light brown color. Applying a voltage of 0.6 volts causes the LTA value to significantly drop to 23.54%, and causes the color of the assembly to appear as a generally neutral gray color. Further increase of the voltage to 0.7 causes the color of the assembly to also appear as a generally neutral gray color, although a little darker gray. Increasing the voltage further above 0.8 volts, however, causes the color of the assembly to begin to change beyond a neutral gray color, and the assembly begins to take on a bluish color. This phenomenon is best seen in the color chart of FIG. 3. As shown, increasing the voltage of this assembly beyond 0.7 volts causes the color to pass from the upper left quadrant of the color chart to the bottom right color chart. Thus, the assembly passes from its initial color in the unactivated state at the upper right quadrant, through the upper left quadrant, and into the bottom left quadrant in its fully activated state. While such opposite quadrants of the color chart would normally expect to produce a neutral gray color, it is contemplated by the present invention that the varying intensities achieved with such electrochromic dyes causes the color to pass beyond a threshold which produces the neutral gray, and the color of the assembly begins to change to a color beyond gray, which can be undesirable. It is believed that the light color of the initial glass substrates is not enough coloring to neutralize the entire dye beyond such a threshold.

Such an electrochromic window assembly is particularly useful as a rear window in an automobile. For example, the assembly can be switched to the darkened state during the daytime for safety and privacy, and can be switched to the lightened state in the night, for better visibility at night.

Example 3

Dark brown glass substrates are combined with an electrochromic medium including a dye that is blue in color upon application of an electrical potential to form a transparent window assembly. The glass substrate used is available from PPG Industries, Inc. and sold under the OPTIBRONZE® trademark. At an LTA level of 15.5%, the TSET of this glass is 9.1%, resulting in a performance ratio of 1.7. The dominant wavelength of this glass substrate is 581 nm and its color as described in the CIELAB and CIELCH color systems is L*=44.37, a*=6.66, b*=28.28, C*=29.05, and H°=76.7°.

Two dark brown glass substrates each having a thickness of 0.125 inches (3.175 mm) were spaced from each other with an electrochromic medium including a dye provided between the dark brown glass substrates. The electrochromic medium included a cathodic compound of viologen and an anodic compound of phenazine, which results in an electrochromic dye capable of coloring to a blue color upon application of electrical potential.

Upon application of an electrical potential to the electrochromic window assembly, the dye of the electrochromic medium immediately switched to a blue color, and the electrochromic window assembly appeared as a neutral gray color.

Table III and FIG. 3 depict the LTA, a*, b*, and C* values for the electrochromic window assembly at varying voltages.

TABLE III

| VOLTS | LTA* (%) | a* | b* | C* |
|---|---|---|---|---|
| 0 | 13.41 | 5.90 | 27.94 | 28.56 |
| 0.6 | 6.94 | −2.46 | 19.63 | 19.78 |
| 0.7 | 4.36 | −6.55 | 15.33 | 16.67 |
| 0.8 | 2.76 | −9.43 | 12.07 | 15.32 |
| 0.9 | 1.55 | −10.45 | 8.62 | 13.55 |
| 1.1 | 0.94 | −11.63 | 7.00 | 13.57 |

As can be appreciated, increasing the voltage applied to the electrochromic window assembly causes the color of the dye to progressively darken. At a voltage of 0, representing no voltage applied to the assembly, the assembly has an LTA of 13.41%, and a generally dark brown color. Applying a voltage of 0.6 volts causes the LTA value to significantly drop to 6.94%, and causes the color of the assembly to appear as a neutral gray color. Further increases of the voltage up to 1.1 volts causes the LTA value to further drop, and causes the assembly to take on an even darker shade of neutral gray.

Such an electrochromic window assembly is particularly useful as an architectural window, which can be darkened without the need for a conventional window blind.

Although the previous discussion discloses the present invention in terms of using organic colorants to produce a desired corresponding or complementing color when in an electrochemically activated state, it should be appreciated that the present invention can be practiced with any type of color changing system, such as but not limited to suspended particle devices, inorganic electrochromic film devices, and liquid crystal dichroic dye systems.

Other variations as would be known to those skilled in the art based on the disclosure herein can be resorted to without departing from the scope of the present invention as defined by the claims that follow.

We claim:

1. An electrochromic window assembly comprising:
    first and second spaced transparent substrates defining a chamber therebetween, at least one of said first and second transparent substrates having a first color with a first hue angle; and
    an electrochromic medium contained in said chamber, said electrochromic medium including at least one dye defining a second color in an electrochemically activated state upon application of electrical potential selected from colors having a second hue angle ranging from said first hue angle plus 45° to said first hue angle minus 45°.

2. An electrochromic window assembly as in claim 1 wherein said second hue angle ranges from said first hue angle of said first color plus 30° to said first hue angle of said first color minus 30°.

3. An electrochromic window assembly comprising:
   first and second spaced transparent substrates defining a chamber therebetween, at least one of said first and second transparent substrates having a color defined by a dominant wavelength ranging from 450 nanometers to 550 nanometers or ranging from 560 nanometers to 590 nanometers; and
   an electrochromic medium contained in said chamber, said electrochromic medium including at least one dye defining a color in an electrochemically activated state upon application of electrical potential selected from colors that coordinate with or complement said color of one of said first and second transparent substrates.

4. An electrochromic window assembly as in claim 3, wherein said electrochromic window assembly has a luminous transmittance for CIE standard illuminant A (LTA) of at least 70%.

5. An electrochromic window assembly as in claim 3, wherein said electrochromic medium has variable light transmittance upon application of electrical potential.

6. An electrochromic window assembly as in claim 5, wherein said electrochromic window assembly has an LTA value of from about 1% to about 80%.

7. An electrochromic window assembly as in claim 3, wherein said first and second transparent substrates are selected from glass and polymeric materials.

8. An electrochromic window assembly as in claim 7, wherein said glass is float glass.

9. An electrochromic window assembly as in claim 3, wherein said first and said second substrates are glass, and further comprising a transparent polymeric layer.

10. An electrochromic window assembly as in claim 9, wherein said transparent polymeric layer is laminated to an outer surface of said first transparent substrate.

11. An electrochromic window assembly as in claim 10, further comprising a glass outer substrate, said transparent polymeric layer laminated between said glass outer substrate and said outer surface of said first transparent substrate.

12. An electrochromic window assembly as in claim 3, wherein said at least one dye of said electrochromic medium comprises at least two compounds comprising at least one anodic electrochromic compound and at least one cathodic electrochromic compound, and wherein application of electrical potential to said electrochromic medium causes simultaneous oxidation of said anodic electrochromic compound and reduction of said cathodic electrochromic compound, thereby causing said compounds to define said color.

13. An electrochromic window assembly as in claim 3, wherein said at least one dye is selected from viologen dyes and phenazine dyes.

14. An electrochromic window assembly as in claim 3, wherein said electrochromic window assembly is selected from automotive windshields, automotive side windows, automotive sun roofs, architectural glazings, architectural windows, architectural skylights, and aircraft transparencies and portions thereof.

15. An electrochromic window assembly as in claim 3, wherein said electrochromic window assembly has a color which is different than the color of said first and second transparent substrates and said at least one dye.

16. An electrochromic window assembly as in claim 3, wherein said at least one of said first and second transparent substrates has a blue color defined by a dominant wavelength ranging from 470 nanometers to 490 nanometers.

17. An electrochromic window assembly as in claim 3, wherein said at least one of said first and second transparent substrates has a green color defined by a dominant wavelength ranging from 500 nanometers to 520 nanometers.

18. An electrochromic window assembly as in claim 3, wherein said at least one of said first and second transparent substrates has a color defined by a dominant wavelength ranging from 575 nanometers to 585 nanometers.

19. An electrochromic window assembly as in claim 3, wherein said at least one of said first and second transparent substrates has a color defined by a hue angle ranging from 50° to 90° and said at least one dye has a generally coordinating color in said electrochemically activated state.

20. An electrochromic window assembly as in claim 3, wherein said at least one of said first and second transparent substrates has a color defined by a dominant wavelength ranging from 450 nanometers to 495 nanometers and said at least one dye is a generally complementing color defined by a dominant wavelength ranging from 570 nanometers to 640 nanometers in said electrochemically activated state.

21. An electrochromic window assembly as in claim 20, wherein said at least one of said first and second transparent substrates has a color defined by a dominant wavelength ranging from 470 nanometers to 490 nanometers and said at least one dye is a generally complementing color defined by a dominant wavelength ranging from 570 nanometers to 620 nanometers in said electrochemically activated state.

22. An electrochromic window assembly as in claim 20, wherein said at least one of said first and second transparent substrates has a green color defined by a dominant wavelength ranging from 495 nanometers to 550 nanometers and said at least one dye is a generally complementing purple color in said electrochemically activated state.

23. An electrochromic window assembly as in claim 22, wherein at least one of said first and second transparent substrates has a color defined by a dominant wavelength ranging from 500 nanometers to 520 nanometers and said at least one dye is a generally complementing color defined by a dominant wavelength ranging from 500 c nanometers to 520 c nanometers in said electrochemically activated state.

24. An electrochromic window assembly as in claim 3, wherein at least one of said first and second transparent substrates has a color defined by a dominant wavelength ranging from 495 nanometers to 550 nanometers and said at least one dye is a generally complementing color defined by a dominant wavelength ranging from 495 c nanometers to 550 c nanometers in said electrochemically activated state.

25. An electrochromic window assembly as in claim 3, wherein said at least one dye is a generally complementing color defined by a dominant wavelength ranging from 440 nanometers to 490 nanometers in said electrochemically activated state.

26. An electrochromic window assembly as in claim 3, wherein at least one of said first and second transparent substrates has a color defined by a dominant wavelength ranging from 575 nanometers and to 585 nanometers and said at least one dye is a generally complementing color defined by a dominant wavelength ranging from 470 nanometers to 490 nanometers in said electrochemically activated state.

27. An electrochromic window assembly as in claim 3, wherein said assembly has a chroma(C*) value of no greater than 15.

28. An electrochromic window assembly as in claim 27, wherein said assembly has a C* value of no greater than 10.

29. An electrochromic window assembly as in claim 27, wherein said electrochromic medium is selected from thermosetting material and thermoplastic material.

30. An electrochromic window assembly as in claim 3, wherein said at least one of said first and second transparent substrates has a dominant wavelength ranging from 450 nanometers to 495 nanometers.

31. An electrochromic window assembly as in claim 3, wherein said at least one of said first and second transparent substrates has a 5 dominant wavelength ranging from 495 nanometers to 550 nanometers.

32. An electrochromic window assembly as in claim 3, wherein said at least one of said first and second transparent substrates has a color defined by a hue angle ranging from 50° to 90°.

33. An electrochromic window assembly comprising:

first and second spaced transparent substrates defining a chamber therebetween, at least one of said first and second transparent substrates having a color defined by a hue angle ranging from 140° to 300°; and an electrochromic medium contained in said chamber, said electrochromic medium including at least one dye defining a color in an electrochemically activated state upon application of electrical potential selected from colors that coordinate with or complement said color of one of said first and second transparent substrates.

34. An electrochromic window assembly as in claim 33, wherein said at least one of said first and second transparent substrates has a color defined by a hue angle ranging from 200° to 240°.

35. An electrochromic window assembly as in claim 33, wherein said at least one of said first and second transparent substrates has a color defined by a hue angle ranging from 150° to 190°.

36. An electrochromic window assembly as in claim 33, wherein said at least one of said first and second transparent substrates has a color defined by a hue angle ranging from 200° to 300°.

37. An electrochromic window assembly as in claim 33, wherein said at least one of said first and second transparent substrates has a color defined by a hue angle ranging from 140° to 200°.

* * * * *